Feb. 25, 1969     A. G. FOX ETAL     3,430,158
OPTICAL MASER HAVING NON-PARALLEL BREWSTER SURFACES
Filed Aug. 21, 1963
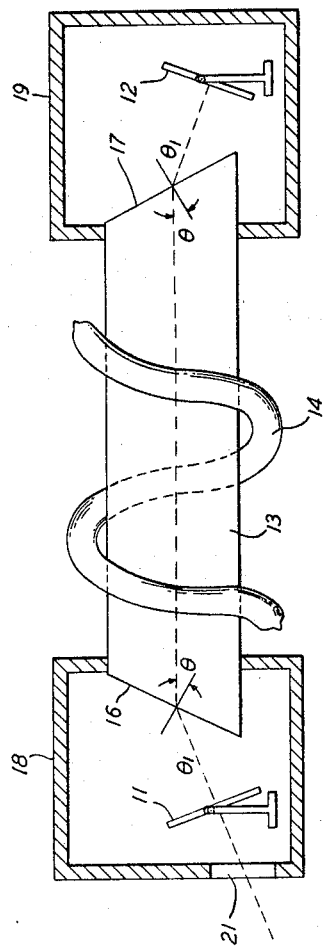
INVENTORS A. G. FOX
L. U. KIBLER
BY
ATTORNEY United States Patent Office 3,430,158
Patented Feb. 25, 1969

3,430,158
OPTICAL MASER HAVING NON-PARALLEL
BREWSTER SURFACES
Arthur G. Fox, Rumson, and Lynden U. Kibler, Middletown, N.J., assignors to Bell Telephone Laboratories, Incorporated, New York, N.Y., a corporation of New York
Continuation-in-part of application Ser. No. 137,260, Sept. 11, 1961. This application Aug. 21, 1963, Ser. No. 304,300
U.S. Cl. 331—94.5      3 Claims
Int. Cl. H01s 3/06; G02b 5/30, 27/28

This invention relates to optical masers.

This application is a continuation-in-part of our co-pending application, Ser. No. 137,260, filed Sept. 11, 1961, now abandoned.

It is now well known that amplification of electromagnetic wave energy may be achieved by means of stimulated emission from certain media in which there is produced, at least intermittently, a population inversion in a characteristic energy level system. Such media are generally referred to as negative temperature or maser media, and the amplification process is called maser action. To promote the efficiency of the interaction of the wave to be amplified and the negative temperature medium, it is sometimes desirable to prolong the interaction time, for example, by slowing the wave as it propagates along an extended structure adjacent the medium, by causing it to resonate in a cavity of appropriate dimensions which contains the medium, or by causing it to multiply traverse the active medium while propagating over an intricate interaction path.

At microwave frequencies it is a relatively simple matter to design cavities and slow wave structures which, typically, have dimensions of the order of the wavelength of the signal to be slowed. At optical frequencies, however, the wavelengths involved are far too small to yield to this classic approach. Instead, it has been necessary to devise resonant structures having dimensions which are thousands of times as large as the wavelengths involved.

One such structure which has been employed successfully in the optical maser is the Fabry-Perot interferometer comprising two plane parallel reflective surfaces separated by a gap of convenient length. Another advantageous structure is the confocal resonator which is described in the Bell System Technical Journal, vol. 41, p. 1347. The surfaces are so positioned with respect to each other and the negative temperature medium that light waves are multiply reflected between the mirrors, traveling through the medium on each passage therebetween. As a wave leaves one mirror surface and travels through the active maser medium it is amplified by interaction with the excited atomic or molecular resonators therein. At the same time it loses some energy due to scattering by inhomogeneities in the medium. When the wave arrives at the second mirror more energy is lost in reflection due to the finite conductivity thereof. Further losses result from the diffraction of light around the edges of the mirrors. It will be appreciated, of course, that the usefulness of the maser depends upon the fact that the energy losses attributable to such factors may, under favorable conditions, be less than the energy gain provided by the maser action as the wave travels through the active medium.

In the past it has been the practice to minimize reflection losses in the maser by immersing the several reflectors in the active medium, thereby providing a substantially uniform and continuous optical path between the reflective surfaces. Optical masers utilizing solid state negative temperature media such as, for example, ruby, have been built with cavity resonators formed by reflective coatings placed directly on specular parallel surfaces of the crystalline member itself. Once fabricated, an optical maser cavity of this type is, of course, dimensionally stable. However, in one class of devices it is desirable that the mirrors of the optical maser interferometer be optically flat and parallel to within a small fraction of a wavelength at the signal frequency. The difficulty of providing two such surfaces on a rather small ruby crystal will readily be apparent to those skilled in the optical arts.

The problems encountered in grinding and polishing accurately aligned specular surfaces on maser crystals would be avoided if the reflector system were fabricated separately. Not only would preparation of the crystal be simplified but also that of the mirrors themselves. Furthermore, placing the mirrors directly on a maser crystal fixes the operating characteristics of the device, whereas independent mirrors would permit their separation, alignment, or their reflectivity to be readily adjusted. In addition, the use of separate mirrors would permit the interchange of active media and cavity resonators for a variety of purposes. In optical masers using gaseous active media, for example, separate mirrors facilitate changing the length of the cavity or of the gas tube. Tubes containing different gaseous media may be placed in the cavity or mirrors of different reflectivity may easily be substituted.

Heretofore it has been considered disadvantageous to form an optical maser cavity by reflective surfaces separated by a gap from the negative temperature medium. Thus, it has been assumed that multiple reflections in the gap between the crystal and the mirror would result in excessive mirror losses as well as, possibly, destructive interference. Although it can be shown that a mirror spaced at a multiple of one-half wavelength from the crystal surface results in no greater loss than one deposited directly thereon, the difficulty of maintaining the proper spacing for optical wavelengths makes such an arrangement impractical. Furthermore, it would be necessary even in most such cases to grind and polish flat precisely parallel surfaces on the crystal.

In one embodiment of the invention, however, light waves are directed iteratively over a light path interior to a negative temperature maser medium by means of reflective surfaces which are separated by gaps from specular surfaces of the medium. Moreover, this is accomplished without substantial effects of the adverse factors described above.

A solid state optical maser in accordance with the invention may be fabricated without the necessity of grinding and polishing precisely parallel specular surfaces on the maser medium.

The invention also includes a solid state optical maser medium or an enclosure for a gaseous active medium having a shape which permits it to be utilized in conjunction with any one of a plurality of interferometer cavity resonators or other optical arrangements for directing a light beam over an interaction path.

The objects of the invention are achieved in one illustrative embodiment thereof comprising an elongated solid state maser medium characterized by a central axis and having first and second optically flat surfaces at opposite ends thereof. The end surfaces need not be precisely parallel to each other nor, indeed, need they have any specific angular orientation with respect to each other except as defined herein. The maser medium is disposed in an elongated optical cavity having first and second reflective end members for iteratively reflecting light rays over an interior path which passes in an axial direction through the medium. Advantageously, the light path enters and leaves the maser medium through the specular end surfaces thereof. The ends of the medium are separated by gaps from the end mirrors of the cavity and a transparent medium which may be, for example, air, fills the gaps.

It is a feature of the invention that the flat surfaces, of the negative temperature medium define a light beam path therethrough and are inclined at a particular angle to the path defined. The angle of inclination $\theta$ is substantially given by the relation $$\theta = \tan^{-1} \sqrt{\frac{\epsilon_2}{\epsilon_1}} \tag{1}$$

where $\epsilon_1$ and $\epsilon_2$ are respectively the dielectric constants of the negative temperature medium and of the transparent medium in the gap between the maser medium and the various reflectors.

A second feature of the invention is that the flat surfaces of the medium which define particular segments of the light beam path are so aligned with respect to each other that their normals lie approximately in the same plane.

In an illustrative embodiment of the invention the reflective members forming the optical cavity resonator are normal to the path of light rays which, after traversing an axial path through the negative temperature medium, pass through and are refracted at the boundary between the medium and the transparent medium in the gap between the inclined end surfaces and the mirrors.

The above-mentioned and other features as well as the objects of the invention will be better understood from the following more detailed description taken in conjunction with the accompanying drawing which depicts in schematic form an optical maser embodying the principles of the invention.

Referring now to the drawing, there is shown an optical maser in accordance with the invention, comprising an interferometer cavity resonator formed by reflective surfaces 11 and 12, at least one which may be partially transmissive to permit the abstraction of energy therefrom. Disposed within the cavity is an elongated negative temperature element 13, typically a crystalline solid state medium or a quartz tube containing a gaseous medium. In either case the medium is characterized by an appropriate energy level system for optical maser action. Advantageously, the energy level system includes a pair of levels between which there may be established, at least intermittently, a metastable population inversion which, upon proper stimulation, returns to equilibrium emitting linearly polarized electromagnetic wave energy having a frequency in the optical range. The energy level structure may be adjusted, for example, by means of the Stark or Zeeman effects produced, respectively, by unidirectional electric or magnetic fields acting on the medium. A light source 14 is positioned near the member 13 for supplying pump energy thereto for inverting the population distribution. The lamp 14 is energized by any convenient power source, not shown in the drawing. It will be appreciated, of course, that not all active maser media are excited by optical pumping but that other pumping techniques known in the art may also be employed with the invention. Many gaseous media, for instance are excited by producing an electrical discharge therein.

The end surfaces 16 and 17 of the crystalline member 13 are ground and polished flat to within a fraction of the operating wavelength of the device. Whereas in numerous prior optical masers it was also necessary that they be parallel to within, for example, a twentieth of a wavelength—a requirement that can be met only with great difficulty—in accordance with the invention they are inclined at an angle $\theta$ to the axis of the crystal. $\theta$, in accordance with the invention, is substantially given by Equation 1 above, which defines what is commonly known as Brewster's angle. The angle is sometimes employed in light polarizing devices. Thus, it is known that if unpolarized light is incident on the boundary between two dielectrics at Brewster's angle, the component having its electric vector in the plane of incidence is transmitted without loss, while the component having its electric vector normal to the plane of incidence is totally reflected. It follows, therefore, that the cavity is resonant only for light of a particular polarization, so that the ends of the member 13 must be aligned with their normals lying substantially in the same plane. It will be understood, of course, that if the medium between the surfaces rotates the plane of polarization of light waves passing therethrough, the alignment of the surfaces may be changed accordingly.

The mirrors 11 and 12 are separated by gaps from the end surfaces 16 and 17 of the medium 13. The gaps are filled with a transparent medium which may be air or, if desired, some other gas or liquid having a refractive index conveniently related to the refractive index of the maser crystal. If a liquid is utilized it will be desirable to enclose the ends of the crystal and the mirrors in reservoirs, indicated by reference numerals 18 and 19, which serve to isolate the fluid from the heat produced in the body of the crystal 13 by the pump power. Unless a certain degree of thermal isolation is achieved, the angle $\theta$ which satisfies relation (1) will tend to change due to changes in the density of the liquid as the temperature rises. It is to be noted that the variation of refractive index with temperature may be utilized to adjust the maser to optimum operating conditions. The mirrors 11 and 12 are positioned so that they are normal to light rays which travel axially through the medium 13 and are refracted at the boundary between the ends thereof and the transparent medium filling the gaps. Thus such rays will be reflected back and forth through the maser medium, interacting with the excited energy level system and consequently being amplified on each passage. Light wave energy may be coupled to and abstracted from the device through windows such as the window 21 in the wall of reservoir 18.

An important advantage of the invention is the relative ease with which the maser medium may be fabricated. It will be noted that although the requirement of parallelism of the end surfaces is eliminated, yet they must be ground at Brewster's angle to the axis of the crystal. However, whereas the lack of precise parallelism of the crystal ends in the more usual form of optical maser is a critical defect, a maser embodying the invention is capable of satisfactory operation so long as the end surfaces conform to Brewster's angle within a rather broad tolerance. This is so because in the prior design, the mirrors comprising the interferometer were deposited directly on the maser medium. Lack of precise parallelism of the ends, therefore, meant lack of precise parallelism of the mirrors. In such a device light waves which initially follow an axial path through the medium are reflected out of it after a few passages, thereby limiting the amplification which may be attained.

In accordance with the invention, however, the mirrors may be separate from the maser medium, thereby permitting them to be adjusted independently of the angular relation between the end surfaces of the medium. In addition, as the amount of light reflected at an interface increases very slowly as $\theta$ deviates from Brewster's angle, precise alignment of the specular end surfaces is not necessary. Moreover, by grinding the end surfaces at Brewster's angle, unwanted reflections at the interface are avoided while fabrication is made easier by the broader tolerances consistent with efficient operation.

While the invention has been described with reference to a particular illustrative embodiment, many modifications and variations may be made by those skilled in the art without departing from its scope and spirit. For example, Brewster angle windows may advantageously be employed with gas optical masers such as that disclosed in copending application Ser. No. 277,651, filed May 2, 1963 by A. Javan and assigned to the assignee hereof. Furthermore, although the above described illustrative optical maser employs a cavity resonator defined by a pair of reflectors, it will be apparent to those skilled in the art that, since gain is produced as a stimulating signal traverses the active medium, the invention may also be employed as an amplifier in which the signal makes but a single passage through the device over the path defined by the Brewster angle surfaces. The propagation direction of the stimulating signal establishes a preferred direction for stimulated emission, while spontaneous emission or noise occurs in random directions. Thus the amplified signal is distinguishable from the background emission by its directionality. As there is no critical length, the medium may be of arbitrary cross section. The noise contribution from elemental volumes of active medium decreases with their distance from the signal path.

What is claimed is:

1. A negative temperature device for use in an optical maser comprising a sample of an active material, said sample having first and second transparent non-parallel surfaces defining an elongated light beam path therethrough, said surfaces being inclined substantially at Brewster's angle to said path.

2. An optical maser comprising a negative temperature medium having a boundary including two transparent non-parallel surfaces defining an elongated light beam path therethrough, said surfaces being inclined substantially at Brewster's angle to said path, reflector means associated with but spaced from the said two transparent surfaces adapted for multiple reflection of light through said negative temperature medium along said light path, and means for pumping said medium to establish a condition of population inversion therein.

3. The device of claim 2 wherein the negative temperature medium is a gas.

References Cited

UNITED STATES PATENTS 2,929,922   3/1960   Schawlow et al. _____ 331—94.5

JEWELL H. PEDERSEN, *Primary Examiner.*

RONALD L. WIBERT, *Assistant Examiner.*

U.S. Cl. X.R.

350—152